(12) United States Patent
Mizoi

(10) Patent No.: US 11,413,997 B2
(45) Date of Patent: Aug. 16, 2022

(54) VEHICLE SEAT

(71) Applicant: TS TECH CO., LTD., Asaka (JP)

(72) Inventor: Kensuke Mizoi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/050,712

(22) PCT Filed: Apr. 23, 2019

(86) PCT No.: PCT/JP2019/017176
§ 371 (c)(1),
(2) Date: Oct. 26, 2020

(87) PCT Pub. No.: WO2019/208555
PCT Pub. Date: Oct. 31, 2019

(65) Prior Publication Data
US 2021/0070205 A1     Mar. 11, 2021

(30) Foreign Application Priority Data

Apr. 27, 2018 (JP) .............................. JP2018-087575
Sep. 26, 2018 (JP) .............................. JP2018-180331

(51) Int. Cl.
*B60N 2/72* (2006.01)
*B60N 2/50* (2006.01)
*B60N 2/68* (2006.01)

(52) U.S. Cl.
CPC ............... *B60N 2/72* (2013.01); *B60N 2/502* (2013.01); *B60N 2/682* (2013.01)

(58) Field of Classification Search
CPC .......... B60N 2/502; B60N 2/50; B60N 2/682; B60N 2/686; B60N 2/7094; B60N 2/72
(Continued)

(56) References Cited

U.S. PATENT DOCUMENTS 4,781,417 A * 11/1988 Shipman ................ B60N 2/686
297/452.24
6,082,824 A * 7/2000 Chow .................... A47C 9/002
297/452.56
(Continued)

FOREIGN PATENT DOCUMENTS

JP    H08140784     6/1996
JP    2001112565     4/2001
(Continued)

OTHER PUBLICATIONS

International Search Report and Written Opinion issued for International Patent Application No. PCT/JP2019/017176, dated Jul. 30, 2019, 13 pages including English translation.

*Primary Examiner* — Mark R Wendell
(74) *Attorney, Agent, or Firm* — Hamre, Schumann, Mueller & Larson, P.C.

(57) ABSTRACT

A vehicle seat includes: left and right side frames disposed left and right separately from each other; a first support member disposed between the left and right side frames to support an occupant; and left and right second support members joined to left and right sides of the first support member and having left and right outer sides supported by the side frames to support the occupant in conjunction with the first support member. The first support member is a plate-shaped member, and has left and right ischial region through holes formed in positions corresponding to ischial bones of the occupant. The second support members are located at least partially within front and rear limits defined by an expanse of the ischial region through holes.

17 Claims, 13 Drawing Sheets

(58) Field of Classification Search
USPC .................................................. 297/452.55
See application file for complete search history.

(56) References Cited

U.S. PATENT DOCUMENTS

| | | | | |
|---|---|---|---|---|
| 6,209,159 | B1* | 4/2001 | Murphy | A47C 7/024 |
| | | | | 297/452.25 |
| 7,503,627 | B2* | 3/2009 | Kawasaki | A47C 7/029 |
| | | | | 297/452.56 |
| 7,533,941 | B2 | 5/2009 | Saitou et al. | |
| 8,540,313 | B2 | 9/2013 | Fujita et al. | |
| 10,279,716 | B2 | 5/2019 | Imamura | |
| 2003/0062758 | A1* | 4/2003 | Cruz Fernandes de Pinho | |
| | | | | B60N 2/7094 |
| | | | | 297/452.52 |
| 2007/0241604 | A1 | 10/2007 | Saitou et al. | |
| 2010/0187881 | A1 | 7/2010 | Fujita et al. | |
| 2012/0133193 | A1* | 5/2012 | Abe | B60N 2/5825 |
| | | | | 297/452.55 |
| 2016/0257231 | A1* | 9/2016 | Imamura | B60N 2/72 |

FOREIGN PATENT DOCUMENTS

| | | | |
|---|---|---|---|
| JP | 2001245744 | | 9/2001 |
| JP | 2002045259 | | 2/2002 |
| JP | 2004016312 | | 1/2004 |
| JP | 2007282697 | | 11/2007 |
| JP | 2009000493 | | 1/2009 |
| JP | 2015085840 | | 5/2015 |
| JP | 2016159007 | | 9/2016 |
| JP | 2020031981 | * | 3/2020 |
| JP | 2020099411 | * | 7/2020 |
| WO | 2007020811 | | 2/2007 |
| WO | WO2007147637 | * | 12/2007 |
| WO | WO2020059882 | * | 3/2020 |

* cited by examiner

FIG.8
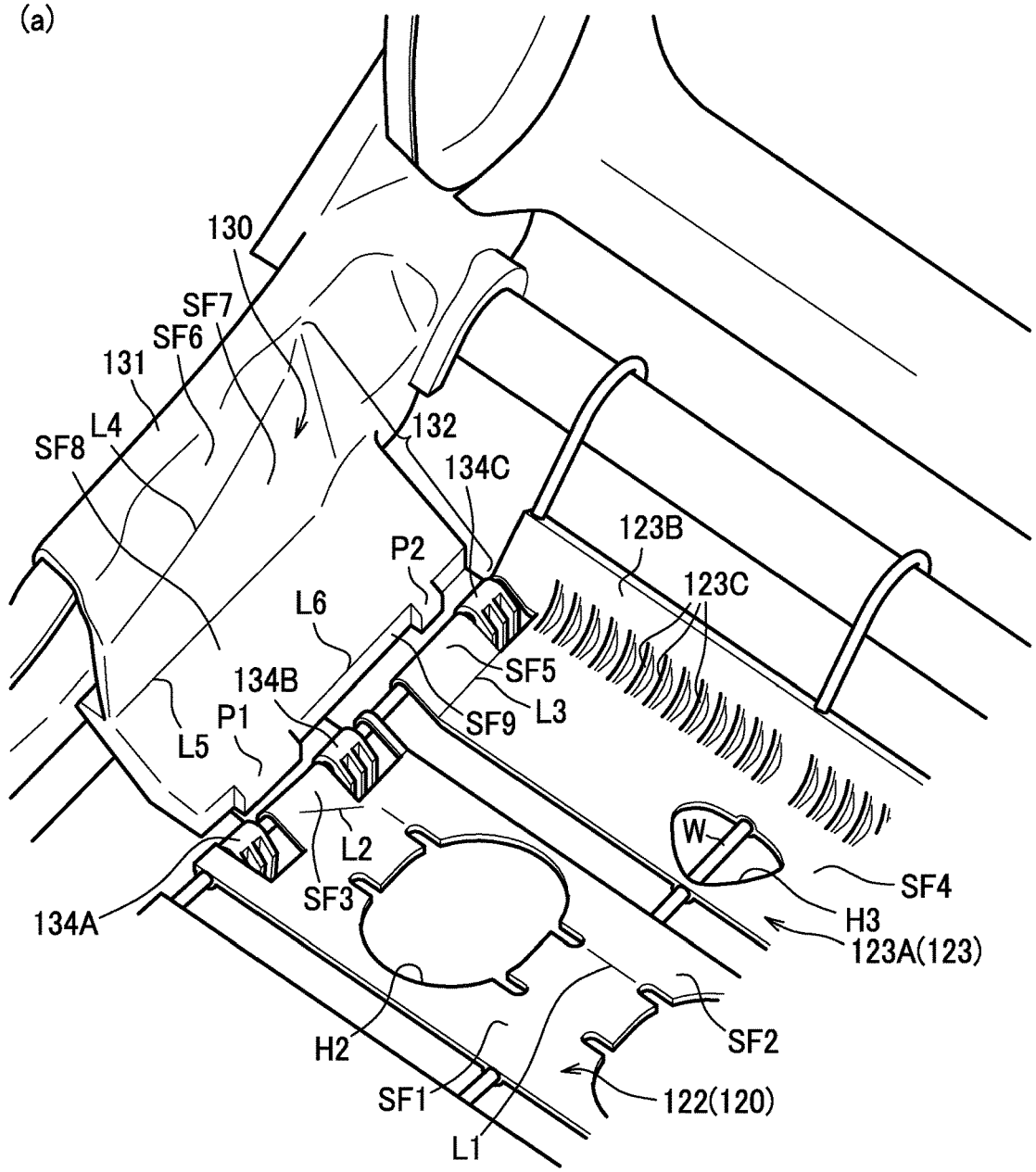
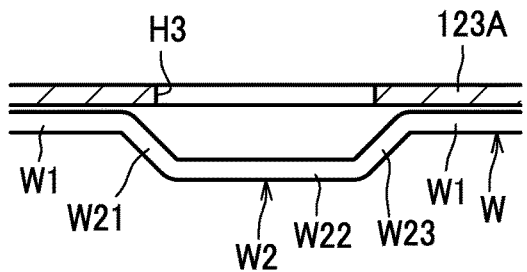
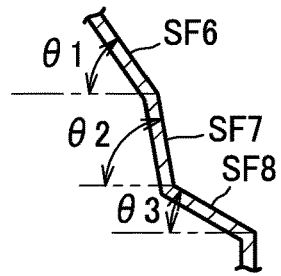

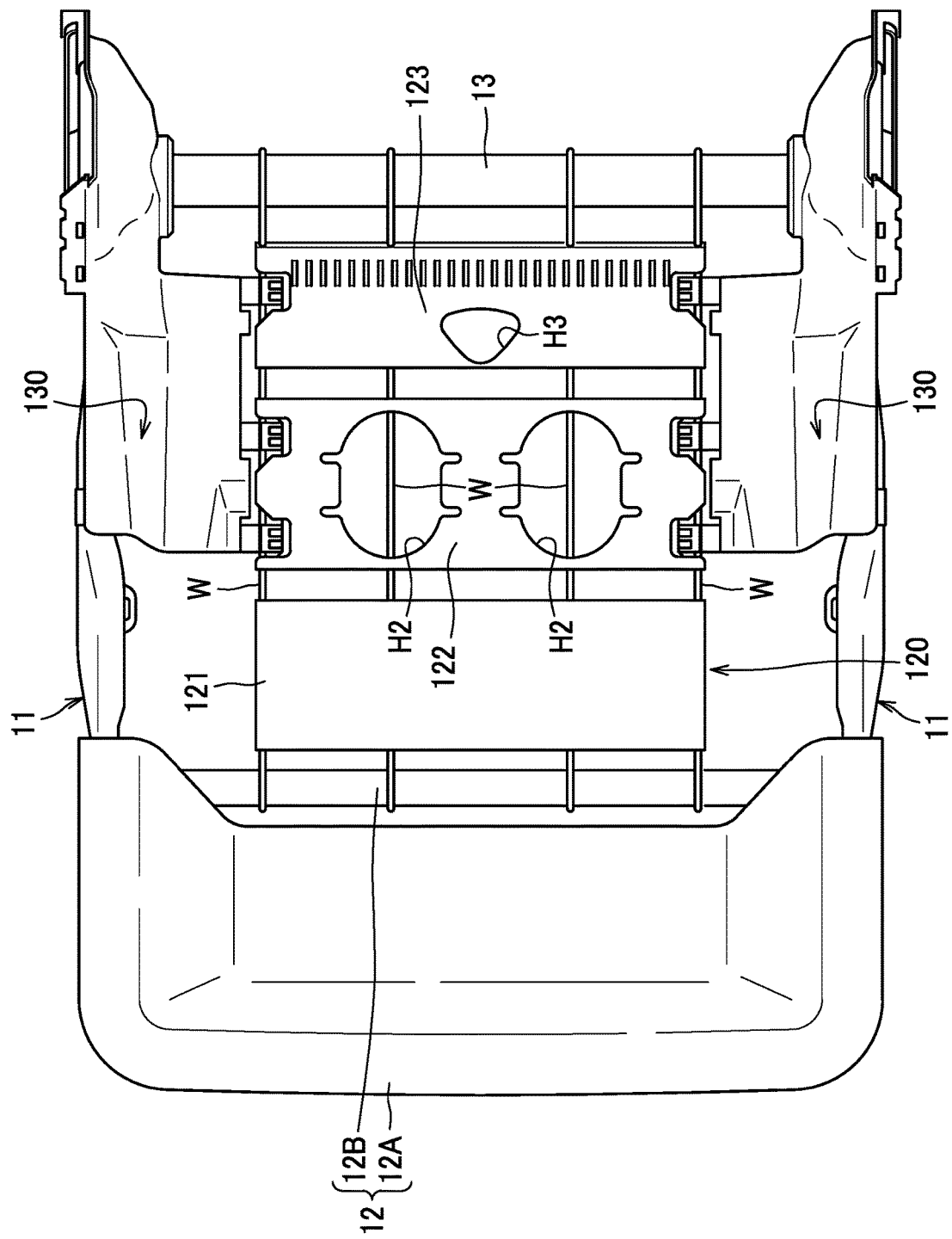

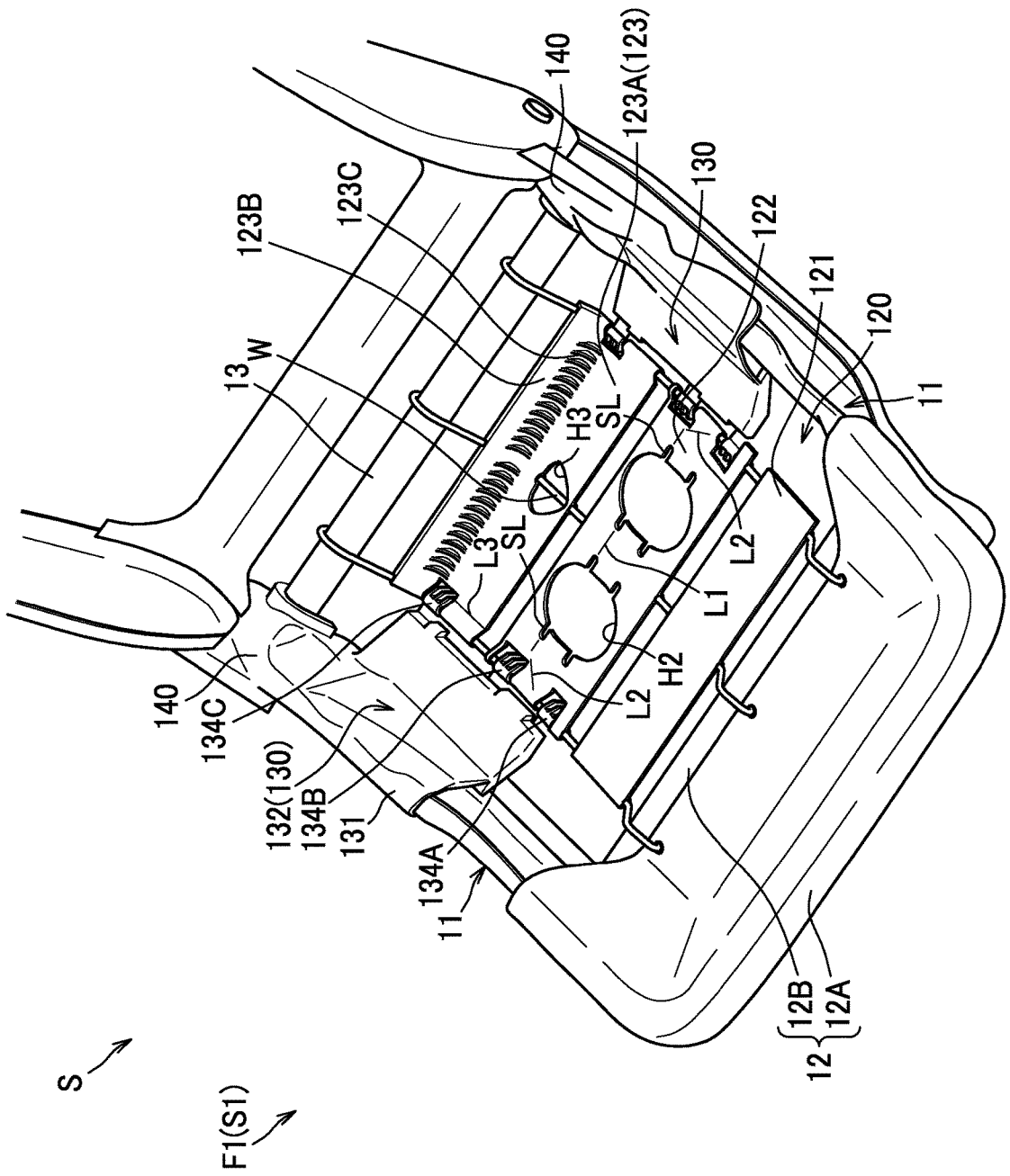

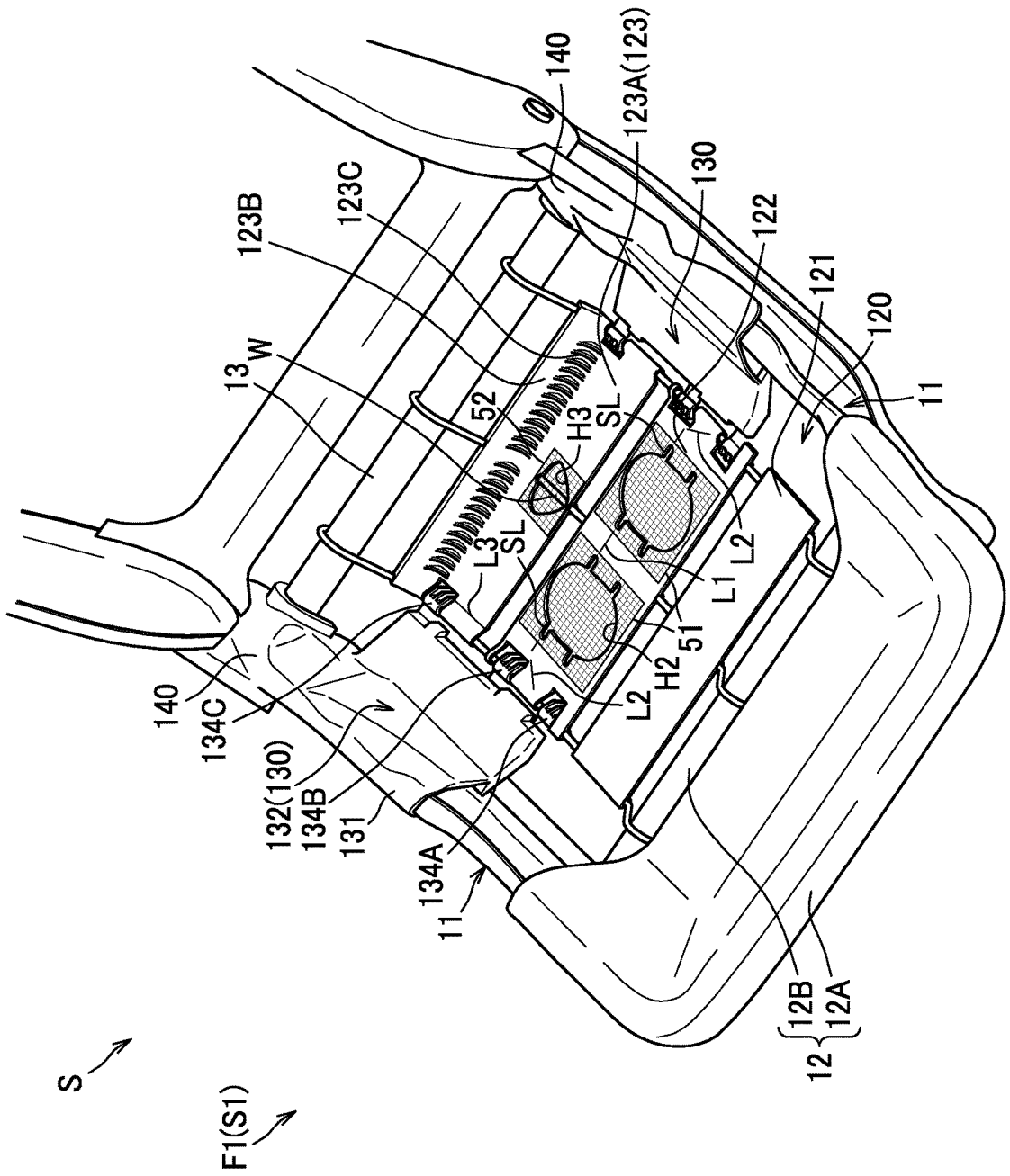

VEHICLE SEAT

TECHNICAL FIELD

The present invention relates to a vehicle seat to be installed in a vehicle such as an automobile.

BACKGROUND ART

As a vehicle seat to be installed in a vehicle such as an automobile, for example, Patent Document 1 discloses a seat comprising a cushion frame and a plate-shaped cushion panel running between front portion and rear portion of the cushion frame to support a pad. In this technical scheme, the cushion panel has a hole formed in a position corresponding to ischial bones of an occupant to relieve pressure applied on the ischial bones and their vicinities of the occupant.

CITATION LIST

Patent Literatures

Patent Document 1: JP 2015-085840 A
Patent Document 2: JP 2001-245744 A

SUMMARY OF INVENTION

In the conventional art, however, the hole formed in a position corresponding to the ischial bones or coccygeal bone would disadvantageously reduce the rigidity of the cushion panel.

In view of this, it is an object of the present invention to seek to achieve the both features: reduction of pressure applied on the ischial and coccygeal bones and their vicinities of an occupant; and enhancement of rigidity of the plate-shaped member for supporting an occupant.

In order to resolve the above-described issue, a vehicle seat according to the present invention comprises: left and right side frames disposed left and right separately from each other; a first support member disposed between the left and right side frames to support an occupant; and left and right second support members joined to left and right sides of the first support member and having left and right outer sides supported by the side frames to support the occupant in conjunction with the first support member.

The first support member is a plate-shaped member, and has left and right ischial region through holes formed in positions corresponding to ischial bones of the occupant.

The second support members are located at least partially within front and rear limits defined by an expanse of the ischial region through holes.

With this configuration, the pressure applied on the ischial bones and their vicinities of the occupant can be relieved through the ischial region through holes; thus, the pressure applied on the ischial bones of the occupant can be reduced. In addition, since the second support members supported by the side frames serve to support the both side regions of the buttocks and the femoral regions of the occupant, the pressure applied on the ischial bones and their vicinities can be further reduced. Since part of the second support members is located within the front and rear limits defined by the expanse of the ischial region through holes, the portion of the first support member around the ischial region through holes can be reinforced by the second support members supported by the side frames, with the result that the rigidity of the plate-shaped first support member can be enhanced. Moreover, stable support of an occupant can also be achieved without causing the occupant to experience discomfort.

Accordingly, both of reduction of pressure applied on the ischial bones and their vicinities and enhancement of rigidity of the plate-shaped member for supporting an occupant can be made mutually compatible.

The second support members may comprise a first joint portion joined to the first support member, and the first joint portion may be located within the front and rear limits defined by the expanse of the ischial region through holes.

With this feature, the portion of the first support member around the ischial region through holes can be reinforced by the first joint portion.

The second support members may comprise a second joint portion joined to the first support member, and the second joint portion may be located rearward relative to the ischial region through holes.

With this feature, the first support member can be supported firmly by the second support members.

A slit may be formed at a peripheral edge of the ischial region through holes.

With this feature, the portion around the ischial region through holes can be made deformable by the slit; thus, the pressure applied on the ischial bones and their vicinities of the occupant can be reduced gradually with decreasing distance from the ischial bones.

The first support member may have a coccygeal region through hole formed in a position corresponding to a coccygeal bone of the occupant, and part of the second support members may be located within front and rear limits defined by an expanse of the coccygeal region through hole.

With this feature, the pressure applied on the coccygeal bone and its vicinity of the occupant can be relieved through the coccygeal region through hole, and the portion of the first support member around the coccygeal region through hole can be reinforced by the second support members.

The vehicle seat as described above may further comprise a pair of connecting members disposed in front and behind separately from each other, each connecting member connecting the left and right side frames, wherein the first support member may comprise a plurality of wires running between the pair of connecting members, and a plastic plate by which the plurality of wires are joined together.

With this feature, the first support member is reinforced by the wires, so that the rigidity of the first support member can be increased.

The second support members may comprise a first engagement portion engageable with the wire.

With this feature, the first support member and the second support members can be joined firmly by the wire.

The vehicle seat as described above may further comprise a cover member with which a laterally inner side of a rear end portion of the side frames is covered, and the second support member may be formed integrally with the cover member in one piece.

With this feature, the rigidity of the second support member can be increased.

The aforementioned slit may be configured to extend in a lateral direction, and located within front and rear limits defined by an expanse of the first joint portion.

With this configuration, in which the slit and the joint portion may be so located as to have their expanses in the front-rear direction overlapping one another, the pressure-supporting strength of the first support member can thus be kept from lowering.

The aforementioned plastic plate may comprise a second engagement portion engageable with the wire, and the slit may preferably be configured to extend in a front-rear direction and located at least partially within front and rear limits defined by an expanse of the second engagement portion.

With this configuration, in which the slit and the second engagement portion are so located as to have their expanses in the front-rear direction overlapping one another, the pressure-supporting strength of the first support member can thus be kept from lowering.

The vehicle seat as described above may further comprise a third support member that is more flexible than the first support member, and the third support member may be provided on the first support member in such a manner as to close at least partially the ischial region through holes.

With this feature, the ischial bones of the occupant can be supported properly by the third support member configured to be more flexible than the first support member, and the pressure applied on the ischial bones and their vicinities of the occupant can be relieved through the third support member provided at the ischial region through holes.

The vehicle seat as described above may further comprise a third support member that is more flexible than the first support member, and the third support member may be provided on the first support member in such a manner as to close at least partially the coccygeal region through hole.

With this feature, the coccygeal bone of the occupant can be supported properly by the third support member configured to be more flexible than the first support member, and the pressure applied on the coccygeal bone and its vicinities of the occupant can be relieved through the third support member provided at the coccygeal region through hole.

BRIEF DESCRIPTION OF DRAWINGS

FIG. 8 includes: (a) an enlarged perspective view showing structures of a right second support member and its vicinity of the cushion frame; (b) a section view showing a coccygeal region through hole and a wire arranged in relation to one another; and (c) a section view showing relative angles of a sixth surface, a seventh surface and an eighth surface.

FIG. 11 is a plan view showing a modified example in which four wires are provided.

FIG. 12 is a perspective view showing a modified example in which wires are engaged with a pan frame.

FIG. 13 is a perspective view showing a modified example in which third support members are provided at ischial region through holes and coccygeal region through hole.

DESCRIPTION OF EMBODIMENT(S)

Hereafter, one embodiment of the present invention will be described with reference to the accompanying drawings. In the following description, the front/rear (frontward/rearward), left/right (leftward/rightward; lateral) and upper/lower (upward/downward; vertical) directions will be designated with reference to the front/rear, left/right and upper/lower directions for a person (occupant) seated on the seat.

Figure 1:
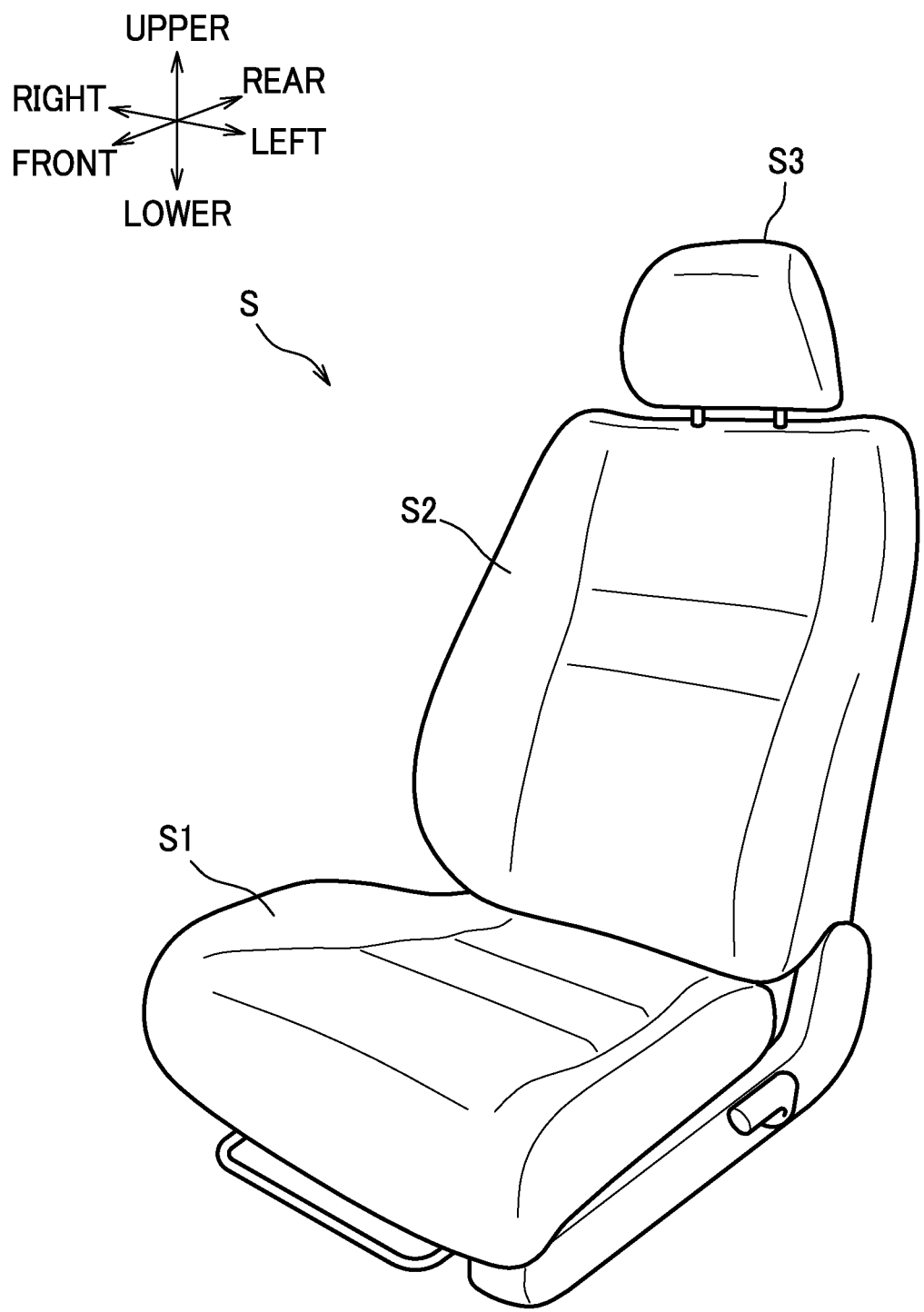
FIG. 1 is a perspective view showing a vehicle seat according to an embodiment.

As shown in FIG. 1, the vehicle seat in the present embodiment is configured as a car seat S to be installed in an automobile, and mainly comprises a seat cushion S1, a seat back S2, and a headrest S3.

Figure 2:
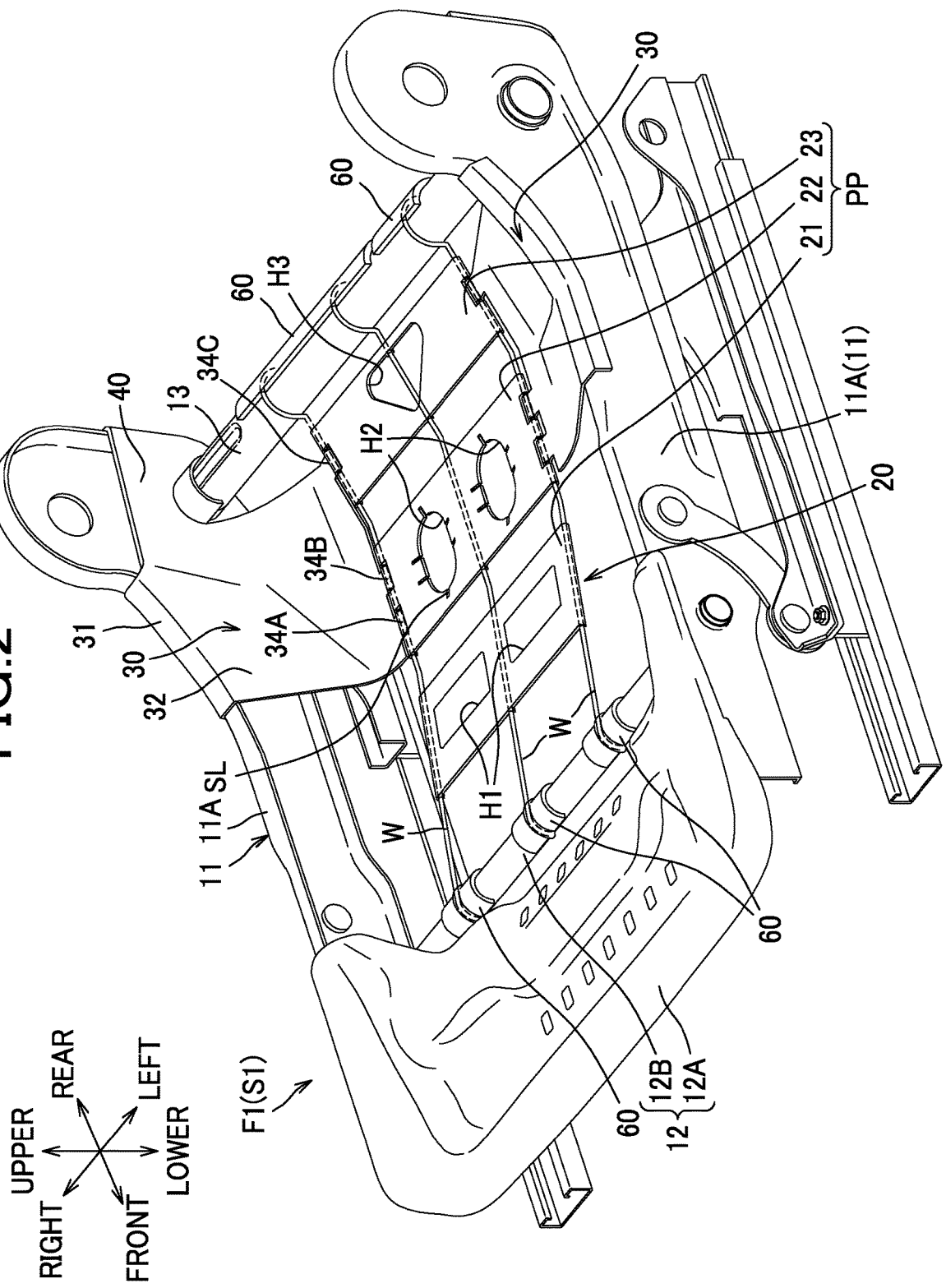
FIG. 2 is a perspective view showing structures of a cushion frame and its vicinity.

Inside the seat cushion S1, a cushion frame F1 as shown in FIG. 2 is incorporated, and constitutes a frame of the seat cushion S1. The seat cushion S1 is configured to have the cushion frame F1 upholstered with a cushion pad made of urethane foam or the like and an outer covering made of fabrics, leather or the like.

The cushion frame F1 comprises left and right side frames 11, a front frame 12, and a rear frame 13.

The left and right side frames 11 are disposed left and right separately from each other. Each side frame 11 mainly comprises a side frame main body 11A made of a metal plate in the shape of a plate elongate in a front-rear direction. To the rear end portions of the left and right side frame main bodies 11A, a back frame (not shown) that constitutes a frame of a seat back S2 is pivotally attached via a reclining mechanism. The seat back S2 is configured to have its back frame upholstered with a back pad made of urethane foam or the like and an outer covering.

The front frame 12 and the rear frame 13 are disposed in front and behind separately from each other.

The front frame 12 comprises a pan frame 12A made of metal plate, and a front pipe 12B made of metal tubing. The pan frame 12A and the front pipe 12B connect front end portions of the left and right side frame main bodies 11A (side frames 11).

The rear frame 13 is made of metal tubing and connects rear end portions of the left and right side frame main bodies 11A (side frames 11). Herein, the front pipe 12B and the rear frame 13 correspond to a pair of connecting members.

The seat cushion S1 comprises a first support member 20, left and right second support members 30, and left and right cover members 40. The cover member 40 is a plastic member with which the laterally inner side of the rear end portion of the side frame 11 is covered, and formed integrally with the second support member 30 in one piece. As the seat cushion S1 has a generally symmetric structure with left and right sides being mirror images of each other, the following description will be given mainly of one side (left or right side) of the structure, and a description of the other side of the structure will be omitted where appropriate.

The first support member 20 is a plate-shaped member that supports an occupant from below with a cushion pad (not shown) interposed therebetween, and disposed between the left and right side frames 11. The first support member 20 comprises three wires W running between the front pipe 12B and the rear frame 13, and three plastic plates PP that join the wires W.

The three plastic plates PP are arranged separately in the front-rear direction, and supported by the three wires W extending in the front-rear direction.

The three wires W are made of metal, and arranged separately in the lateral direction. Front end and rear end portions of the three wires W are provided with sheathing members 60, respectively. The sheathing members 60 are members which are made of plastic, with which the front end and rear end portions of the wires W each curved substantially in the shape of a segment of a circle are covered and enveloped, and which are formed integrally with the wires W. The sheathing member 60 has a shape of a cylinder with a slit cut all along the length in a lateral direction to thereby exhibit an approximately C-shaped cross section. The front end and rear end portions of each wire W are covered with the sheathing members 60. The front end portion of each wire W is hooked on the front pipe 12B, and the rear end portion of each wire W is hooked on the rear frame 13.

The wire W located in a laterally central position supports a laterally central portion of each of the plastic plates PP. The wires W located at the left and right sides support left and right end portions of each of the plastic plates PP.

In the following description, the plastic plate PP located in the frontmost position is also referred to as "front plate 21", the plastic plate PP located in the center is also referred to as "center plate 22", and the plastic plate PP located in the rearmost position is also referred to as "rear plate 23".

The front plate 21 is formed in a shape of a flat plate, having holes H1 through which ducts for fans (not shown) are routed. The holes H1 are arranged separately in the lateral direction. Left and right holes H1 are located, respectively, between the center wire W and the left side wire W and between the center wire W and the right side wire W. The left and right end portions of the front plate 21 are not joined to the side frames 11 and supported only by the wires W.

The front plate 21 is slanted off the horizontal plane with a rear end thereof located higher than a front end thereof. The front end of the front plate 21 is located higher than the center plate 22.

The center plate 22 is formed in a shape of a flat plate, located in a position parallel to the horizontal plane. The center plate 22 is located lowest among the three plastic plates PP, and has left and right ischial region through holes H2 formed in positions corresponding to ischial bones of an occupant. That is, the ischial region through holes H2 are provided in the portions located lowest in the surface of the first support member 20 which supports the occupant.

Each of the ischial region through holes H2 is a long hole elongate in the front-rear direction, and arranged separately in the lateral direction. The left and right ischial region through holes H2 are located between the center wire W and the left side wire W and between the center wire W and the right side wire W, respectively. Each ischial region through hole H2 may cover an area, for example, of 20 to 36 square centimeters. The ischial region through hole H2 may have dimensions of 70 to 90 millimeters in the front-rear direction and 40 to 60 millimeters in the lateral direction. If the ischial region through hole H2 were too small, relief of the pressure which would be obtained therefrom could not be made sufficient, while if too large, the pressure-supporting strength would be lowered.

Figure 3:
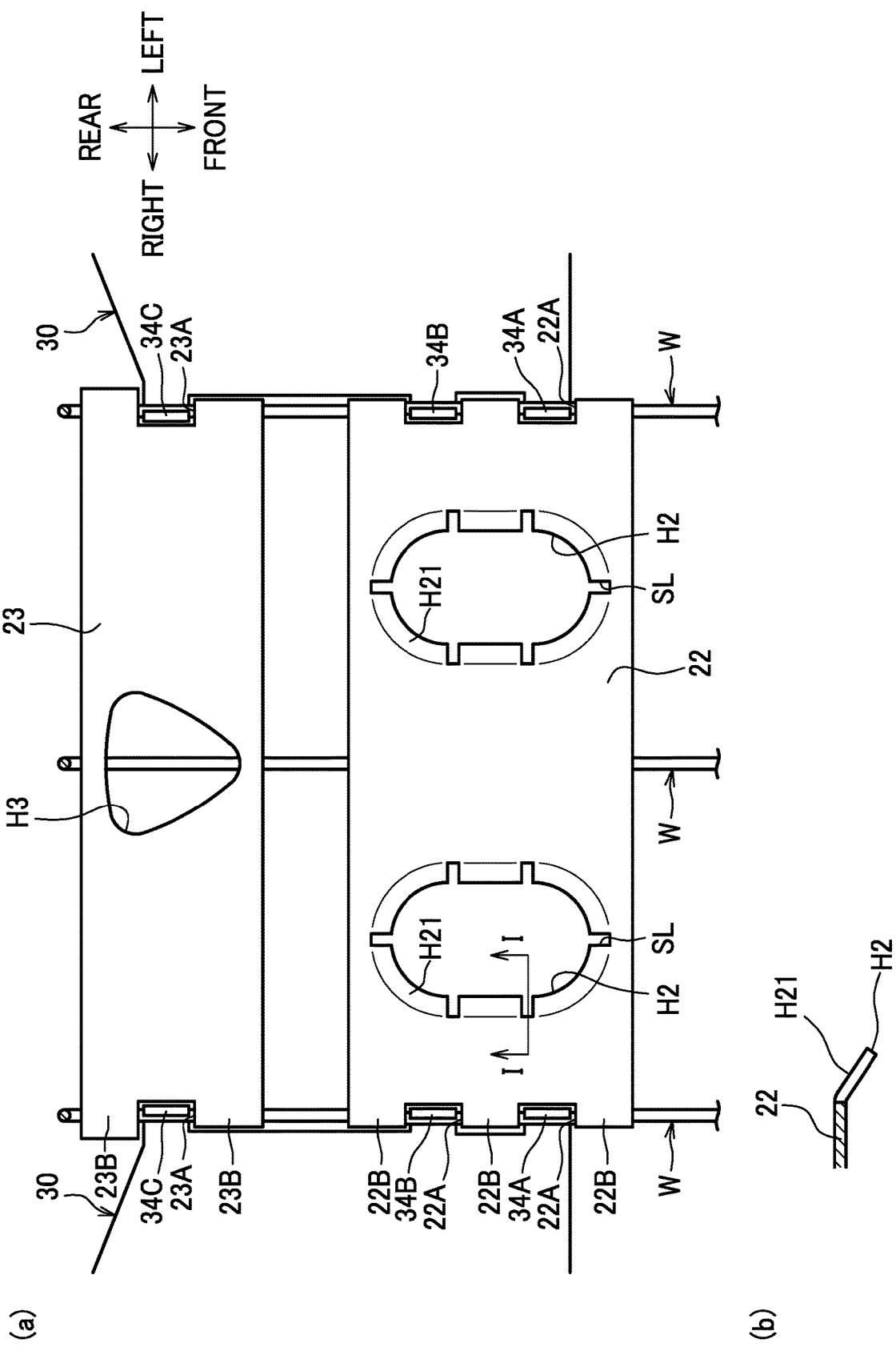
FIG. 3 includes: (a) a diagram of a center support member and a rear support member as viewed from above; and (b) a section view taken along the line I-I of FIG. 3(a).

As shown in FIG. 3(*a*), the center plate 22 has indents 22A formed two at each of the left and right end portions thereof, each indent 22A being so arranged as to open on the laterally outer side. The wires W are laid across the corresponding indents 22A.

Figure 4:
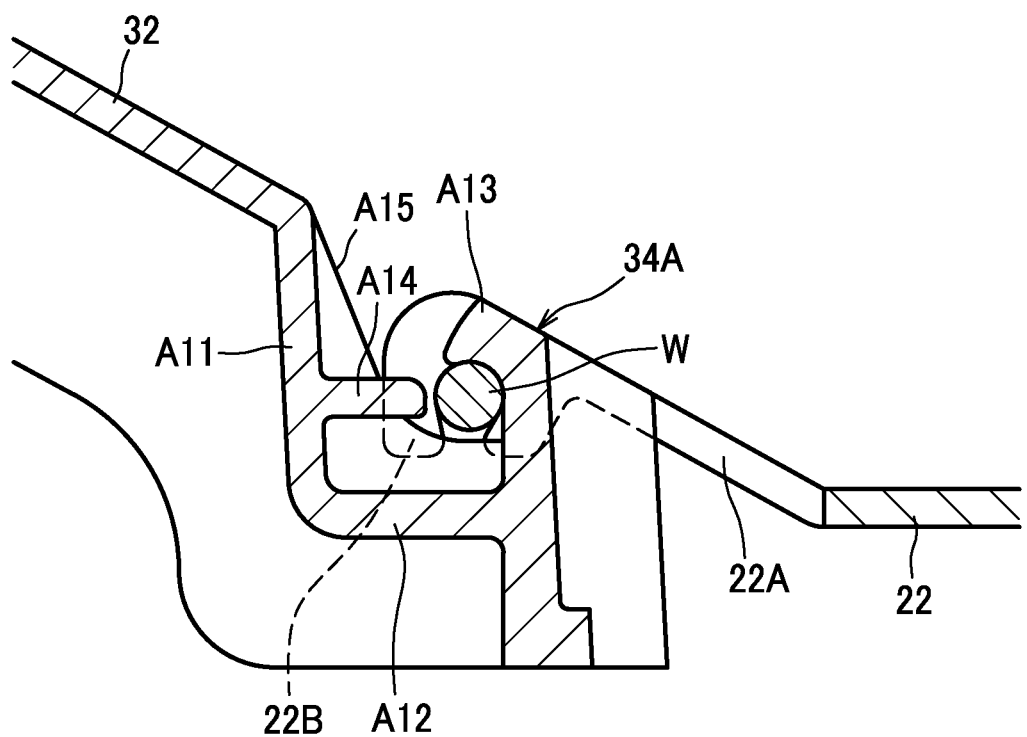
FIG. 4 is a section view showing structures of a joint portion and its vicinity.

At each of the left and right end portions of the center plate 22, three second engagement portions 22B formed in such positions that each of the indents 22A is located between adjacent second engagement portions 22B. As shown in FIG. 4, each of the second engagement portions 22B is so formed as to protrude downward from an undersurface of the center plate 22, in a cross-sectional shape of a letter U which opens on a side facing downward, and is engaged with the wire W. The left and right end portions of the center plate 22 are slanted off the horizontal plane, such that its upper surface is substantially flush with an upper surface of a second portion 32, which will be described later, of the second support member 30.

Referring back to FIG. 3(*a*), six slits SL are formed at a peripheral edge of each ischial region through hole H2. Each of the slits SL extends through upper and lower sides of the center plate 22 and has its one end connected to and opening on the ischial region through hole H2. The slits SL are provided in such positions that one slit extending in the front-rear direction is located at each of arcuate front and rear peripheral edges of the ischial region through hole H2, and two slits extending in the lateral direction are located at each of left and right peripheral edges of the ischial region through hole H2.

The slits SL extending in the front-rear direction are located at least partially within front and rear limits defined by an expanse of any of the second engagement portions 22B. In the present embodiment, the slits SL extending in the front-rear direction are located in its entirety within the front and rear limits defined by the expanse of the corresponding second engagement portion 22B. With this arrangement, in which the slits SL and the second engagement portions 22B are located with their expanses in the front-rear direction overlapping one another, the pressure-supporting strength of the first support member 20 can thus be kept from lowering. It is to be understood that although this example illustrates that the both of the slits SL at the front peripheral edge and at the rear peripheral edge are so located as to have their front-rear expanses overlapping those of the second engagement portions 22B, an alternative arrangement may be feasible in which only one of the slits SL is so located as to have its front-rear expanse overlapping that of the corresponding second engagement portion 22B so that the pressure-supporting strength of the first support member 20 is adjusted properly.

The slits SL extending in the lateral direction are located within front and rear limits defined by an expanse of any of joint portions 34A, 34B. With this arrangement, in which the slits SL and the joint portions 34A, 34B are located with their expanses in the front-rear direction overlapping one another, the pressure-supporting strength of the first support member 20 can thus be kept from lowering. It is to be understood that although this example illustrates that all of the slits SL extending in the lateral direction are located within front and rear limits defined by the expanse of any of the joint portions 34A, 34B, an alternative arrangement may be feasible in which only a subset of the slits SL are located within the front and rear limits defined by the expanse of any of the joint portions 34A, 34B so that the pressure-supporting strength of the first support member 20 is adjusted properly.

As shown in FIG. 3(*b*), a peripheral portion H21 around the ischial region through hole H2 in which each slit SL is formed is so slanted as to descend toward the center of the ischial region through hole H2.

As shown in FIG. 3(a), the rear plate 23 is formed in a shape of a flat plate, located in a position slanted off the horizontal plane with a rear end thereof located higher than a front end thereof. The rear end of the rear plate 23 is located higher than the center plate 22. The rear plate 23 has one coccygeal region through hole H3 formed in a position corresponding to a coccygeal bone of an occupant. The coccygeal region through hole H3 is in a laterally central position of the rear plate 23. The coccygeal region through hole H3 is located rearward relative to each of the ischial region through holes H2, and has its laterally central position located within left and right limits defined by a region between the ischial region through holes H2. The coccygeal region through hole H3 is a substantially triangular hole as viewed from above which is oriented with one vertex thereof pointing frontward.

The coccygeal region through hole H3 may cover an area, for example, of 6 to 12 square centimeters. The coccygeal region through hole H3 may have dimensions of 25 to 35 millimeters in the front-rear direction and 30 to 40 millimeters in the lateral direction. If the coccygeal region through hole H3 were too small, relief of the pressure which would be obtained therefrom could not be made sufficient, while if too large, the pressure-supporting strength would be lowered.

The rear plate 23 has indents 23A of which one is provided at a left end portion thereof and the other at a right end portion thereof, each indent 23A being so arranged as to open on the laterally outer side. The wires W are laid across the corresponding indents 23A.

At each of the left and right end portions of the rear plate 23, two second engagement portions 23B are formed in such positions that each of the indents 23A is located between the two second engagement portions 23B. Each of the second engagement portions 23B is configured to have the same structure as that of the second engagement portion 22B described above, and is engaged with the wire W. Although not designated by reference characters, at each of the left and right end portions of the front plate 21 as well as laterally central portion of each plastic plate PP, engagement portions having the same structure as those of the second engagement portions 22B, 23B are formed.

The left and right second support members 30 are members to support an occupant in conjunction with the first support member 20, and are made of plastic. The second support members 30 are discrete parts provided discretely from the first support member 20 and disposed one at each of the left and right sides of the first support member 20 (specifically, of the center plate 22 and the rear plate 23).

The second support members 30 are located rearward relative to the central positions (equidistant from front and rear ends) of the side frames 11. Each second support member 30 comprises a first portion 31 located on top of the side frame 11, a second portion 32 extending from the first portion 31 obliquely laterally inward and downward, and three joint portions 34A, 34B, 34C formed at a laterally inner end of the second portion 32.

The first portion 31 is a plate-shaped portion, joined to the side fame 11 by bolts, plastic nails, clips, etc. The first portion 31 has its rear end portion formed integrally with the cover member 40 in one piece. Part of the first portion 31 is located within the front and rear limits defined by the expanses of the ischial region through holes H2.

The second portion 32 is a plate-shaped portion provided to support the both side regions of the buttocks and the femoral regions of an occupant, and slanted off the horizontal plane so as to support the buttocks and other regions of the occupant obliquely from below. The second portion 32 has its rear end portion formed integrally with the cover member 40. Part of the second portion 32 is located within the front and rear limits defined by the expanses of the ischial region through holes H2.

The three joint portions 34A-34C are portions joined to the first support member 20 (the center plate 22 or the rear plate 23). The three joint portions 34A-34C are joined to the first support member 20 to support the first support member 20. Two front joint portions 34A, 34B are examples of a first joint portion, which are located within the front and rear limits defined by the expanses of the ischial region through holes H2. The two front joint portions 34A, 34B are joined to the center plate 22 via the wire W.

The rearmost joint portion 34C is an example of a second joint portion, which is located rearward relative to the ischial region through holes H2. To be more specific, the joint portion 34C is located within front and rear limits defined by an expanse of the coccygeal region through hole H3. In other words, part of the second support member 30 is located within the front and rear limits defined by the expanse of the coccygeal region through hole H3. The rearmost joint portion 34C is joined to the rear plate 23 via the wire W.

Each of the joint portions 34A-34C is located in the corresponding indent 22A, 23A of the plates 22, 23 (see FIG. 3). As structures of joining the joint portions 34A-34C to the plates 22, 23 are substantially the same as one another, the following discussion is directed to the features related to the joint portion 34A as an exemplary configuration.

As shown in FIG. 4, the joint portion 34A is engaged with the wire W located in the indent 22A. The joint portion 34A mainly comprises a first wall A11 extending from the second portion 32 downward, a second wall A12 extending from a lower end of the first wall A11 in a laterally inward direction, and a hook A13 as an example of a first engagement portion extending from a laterally inner end of the second wall A12 upward. The hook A13 has an upper end portion shaped like a hook protruding in a laterally outward direction; this hook-shaped upper end portion is engaged with the wire W.

A restraint portion A14 extending toward the wire W engaged with the hook A13 is formed at about a midpoint in height of the first wall A11. The restraint portion A14 is a portion serving to restrain the wire W from coming off the hook A13, and configured such that a distance between the restraint portion A14 and the extremity of the hook A13 is smaller than a diameter of the wire W.

A guide rib A15 is formed between the first wall A11 and the hook A13 to guide the wire W toward the extremity of the hook A13. The guide rib A15 is a plate-shaped portion having a surface perpendicular to the front-rear direction, and formed to connect the first wall A11, the second wall A12 and the hook A13. The guide rib A15 has an upper end extending from an upper end of the first wall A11 obliquely in a laterally-inward-and-downward direction, and further extending laterally inward to the hook A13 under the wire W engaged with the hook A13. The number of such guide ribs A15 may be chosen as desired; for example, a plurality of guide ribs A15 may preferably be arranged with spacing in the front-rear direction.

Next, a description will be given of a method of mounting the first support member 20 and the second support members 30 to the cushion frame F1.

As shown in FIG. 2, first, the second support members 30 are attached to the left and right side frames 11, respectively, by engaging, fastening with bolts, or other methods. Thereafter, the sheathing members 60 which are integrally formed respectively with the end portions of the three wires W are pushed from above and fitted into the front pipe 12B and the rear frame 13, and thereby attached to the front pipe 12B and the rear frame 13.

Thereafter, the wires W are pushed in from above and engaged into the joint portions 34A-34C of the left and right second support members 30. Lastly, the second engagement portions 22B, 23B of each of the plastic plates PP are pushed on from above and engaged with the wires W. In this way, the support members 20, 30 are attached to the cushion frame F1.

According to the present embodiment as described above, the following advantageous effects can be achieved.

Since the ischial region through holes H2 are formed in the center plate 22 so that the pressure applied on the ischial bones and their vicinities of an occupant can be relieved through the ischial region through holes H2, the pressure applied on the ischial bones of the occupant can be reduced. Since the second support members 30 serve to support the both side regions of the buttocks and the femoral regions of the occupant, the pressure applied on the ischial bones and their vicinities can be further reduced. Since part of the second support members 30 (front joint portions 34A, 34B) is located within the front and rear limits defined by the expanses of the ischial region through holes H2, the portion of the center plate 22 around the ischial region through holes H2 can be reinforced by the second support members 30, with the result that the rigidity of the plate-shaped center plate 22 can be enhanced.

Since the second support members 30 comprise the joint portions 34C joined to the rear plate 23 in positions rearward relative to the ischial region through holes H2, the rear plate 23 can be supported firmly by the second support members 30.

Since the slits SL formed at peripheral edges of the ischial region through holes H2 serve to make the portions around the ischial region through holes H2 deformable, the pressure applied on the ischial bones and their vicinities of the occupant can be reduced gradually with decreasing distance from the ischial bones.

Since the rear plate 23 has the coccygeal region through hole H3, the pressure applied on the coccygeal bone and its vicinity of the occupant can be relieved through the coccygeal region through hole H3. Moreover, since part of the second support members 30 is located within the front and rear limits defined by the expanse of the coccygeal region through hole H3, the portion of the rear plate 23 around the coccygeal region through hole H3 can be reinforced by the second support members 30.

Since the first support member 20 comprises the second engagement portions 22B, 23B engaged with the wires W, the first support member 20 can be supported firmly by the wires W.

Since the second support members 30 comprise hooks A13 engaged with the wires W, the first support member 20 and the second support members 30 can be joined firmly via the wires W. Furthermore, since such use of the wires W via which the first support member 20 and the second support members 30 are joined allows left and right end portions of the first support member 20, when subjected to a load, to turn about the wires W, the amount of vertical displacement of the first support member 20 can be greater, so that the seating comfort for the occupant can be improved.

Since the second support member 30 is formed integrally with the cover member 40 in one piece, the rigidity of the second support member 30 can be increased.

Since the front plate 21, 121, the center plate 22, 122, and the rear plate 23, 123 are located widely apart from one another, a collision which would otherwise occur between one another when an unexpectedly large load is placed thereon can be restricted. Since three plastic plates are used to receive a load of an occupant, the load can be distributed among the three plates in more properly adjusted proportion, as compared with an alternative configuration in which the front plate 21, 121, the center plate 22, 122, and the rear plate 23, 123 are constructed of a single plastic plate.

The distances between adjacent plates among the front plate 21, 121 and the center plate 22, 122 and the rear plate 23, 123 may be determined with consideration given to the physique and weight of an occupant of a large build so that even when such an occupant gets seated, no collision takes place between the plastic plates.

Described above is an exemplified embodiment of the present invention, and the present invention may be modified where appropriate and implemented as illustrated in the following other examples of implementation.

Figure 5:
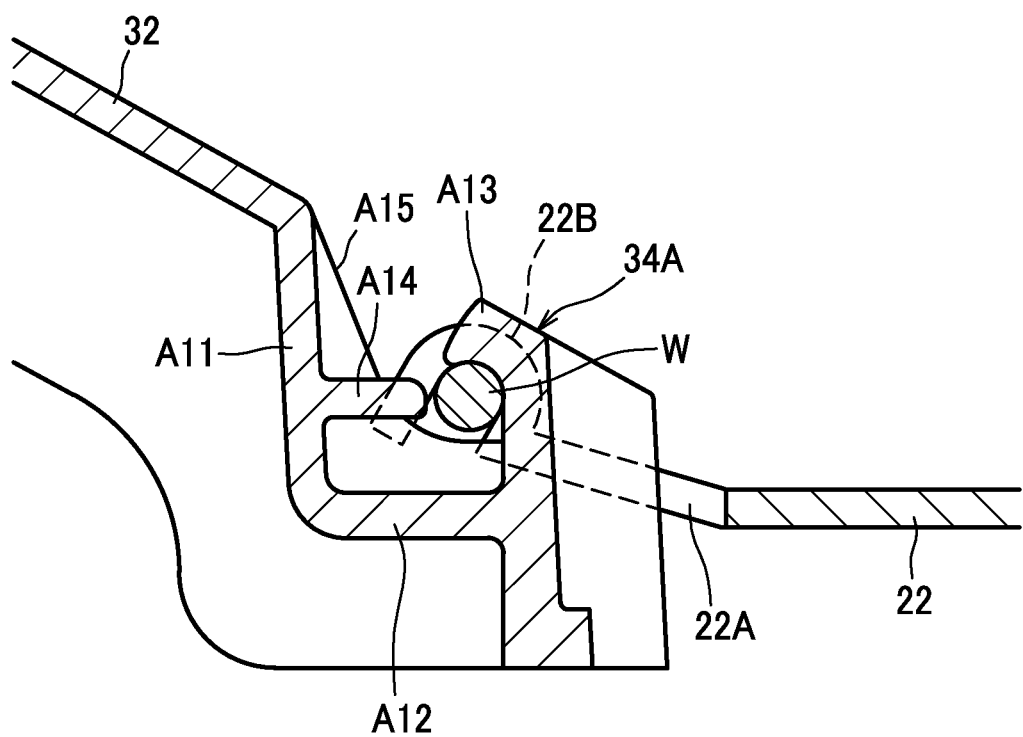
FIG. 5 is a section view showing a modified example of the joint portion.

Although the above-described embodiment shows the second engagement portion 22B as protruding from the undersurface of the center plate 22, the present invention is not limited to this configuration. For example, as shown in FIG. 5, the second engagement portion 22B may be so formed as to protrude from an upper surface of the center plate 22. It is to be understood that the other engagement portions as well may be so formed similarly as to protrude from the upper surface of the plastic plate.

The car seat S may be configured as a second embodiment described below. In describing the second embodiment, the same elements as those of the above-described embodiment are designated by the same reference characters, and a description thereof will be omitted.

Figure 6:
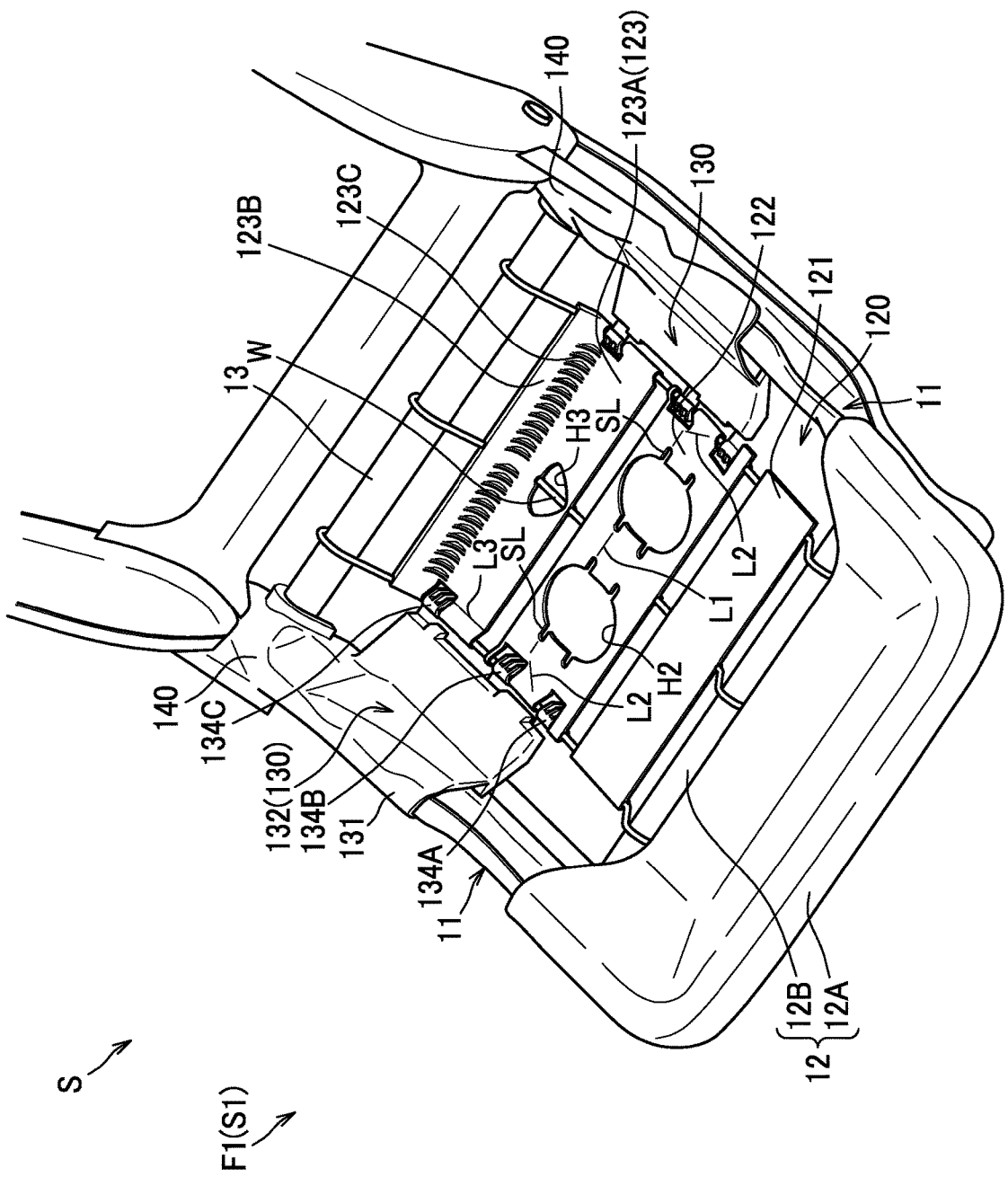
FIG. 6 is a perspective view showing a cushion frame according to a second embodiment.
Figure 7:
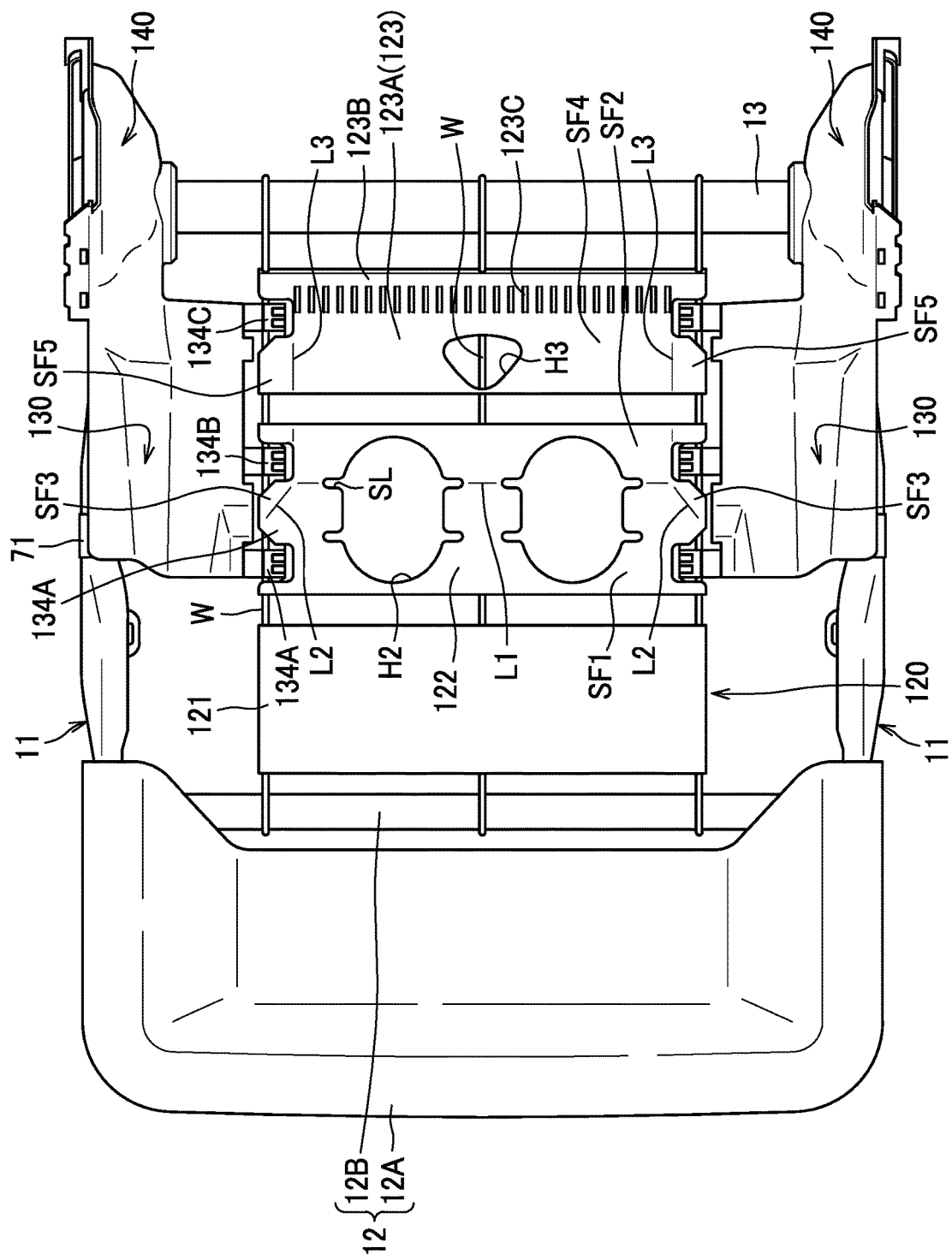
FIG. 7 is a plan view showing the cushion frame.

As shown in FIGS. 6 and 7, the car seat S according to the second embodiment comprises a first support member 120 and second support members 130 which are different from those illustrated in relation to the above-described embodiment. In the second embodiment, the wires W have their front end portions engaged with the front pipe 12B and their rear end portions engaged with the rear frame 13.

The first support member 120 comprises a front plate 121, a center plate 122, and a rear plate 123. The front plate 121, the center plate 122 and the rear plate 123 are each formed in a shape of a rectangular plate.

The front plate 121 is different from that of the above-described embodiment in that the holes H1 described above (see FIG. 2) are not provided.

The center plate 122 is bent along a first bend line L1 and second bend lines L2 as references. The first bend line L1 is a line extending in the lateral direction, and arranged across the left and right ischial region through holes H2. To be more specific, the first bend line L1 is located in a position shifted rearward relative to the central position (equidistant from front and rear edges) of the ischial region through holes H2. The first bend line L1 is arranged in alignment with the slits SL provided on the left and right straight side edges of the oblong figures of the ischial region through holes H2.

The second bend lines L2 are provided one at each of the left and right end portions of the center plate 122. The right second bend line L2 comprises a portion extending from a right end of the first bend line L1 obliquely in a frontward-and-rightward direction and connecting to a right end of the center plate 122, and a portion extending from the right end of the first bend line L1 rearward parallel to the front-rear direction and connecting to a rear end of the center plate 122.

The left second bend line L2 is configured to be approximately symmetric to the right second bend line L2.

The center plate 122 has an upper surface that comprises a first surface SF1, a second surface SF2, and two third surfaces SF3. The first surface SF1 is bordered by the first bend line L1 on, and slanted relative to, the second surface SF2; the third surface SF3 is bordered by the second bend line L2 on, and slanted relative to, the first surface SF1 and the second surface SF2.

Figure 10:
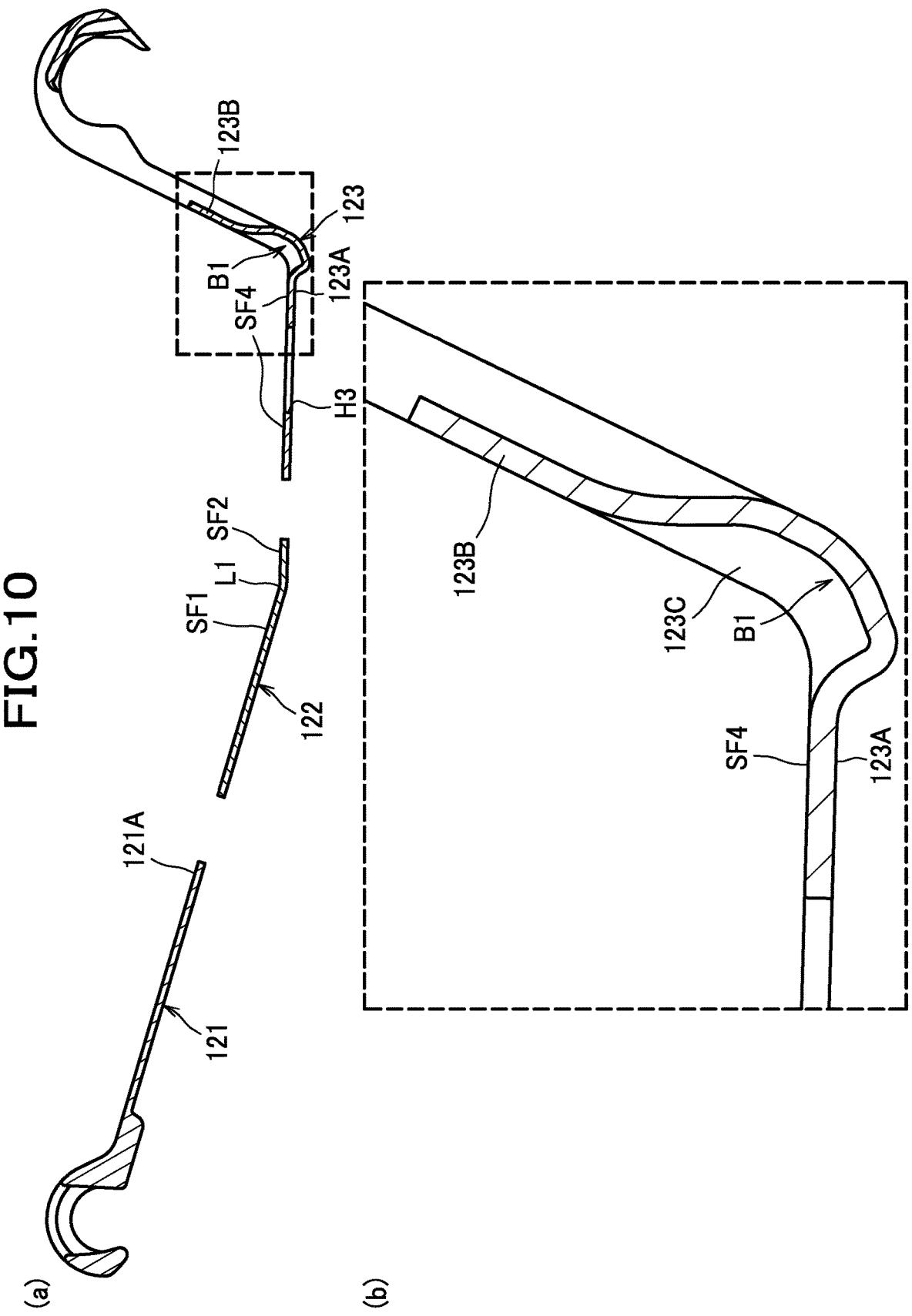
FIG. 10 includes: (a) a section view showing a first support member; and (b) an enlarged section view showing structures of a rib and its vicinity.

As shown in FIG. 10(a), the first surface SF1 is a slanted surface extending from a front end (first bend line L1) of the second surface SF2 obliquely in a frontward-and-upward direction, and so arranged as to be substantially flush with an upper surface 121A of the front plate 121. The second surface SF2 extends from a rear end of the first surface SF1 rearward in an approximately horizontal position.

As shown in FIG. 6 and FIG. 7, the left and right third surfaces SF3 are located on laterally outer sides of the left and right second bend lines L2. The right third surface SF3 is a slanted surface extending from the right second bend line L2 obliquely in a rightward-and-upward direction. The left third surface SF3 is configured to be approximately symmetric to the right third surface SF3.

The upper surface of the center plate 122 has a right end comprised of a right end of the first surface SF1 and a right end of the third surface SF3. The upper surface of the center plate 122 has a left end comprised of a left end of the first surface SF1 and a left end of the third surface SF3. The upper surface of the center plate 122 has a rear end comprised of a rear end of the second surface SF2 and rear ends of the left and right third surfaces SF3.

The rear plate 123 comprises a base portion 123A located in an approximately horizontal position, a raised wall portion 123B extending from a rear end of the base portion 123A obliquely in a rearward-and-upward direction, and a plurality of ribs 123C connected to the base portion 123A and to the raised wall portion 123B. The plurality of ribs 123C are arranged separately in the lateral direction.

The base portion 123A has a coccygeal region through hole H3 configured to have approximately the same structure as described in relation to the above-described embodiment. In this embodiment, the wire W located in the center among the three wires W, to be more specific, the wire W arranged across the coccygeal region through hole H3 in the front-rear direction has a portion corresponding to the coccygeal region through hole H3 formed in a shape as shown in FIG. 8(b). More specifically, the wire W comprises two support portions W1 that are provided to support front and rear portions on the peripheries of the coccygeal region through hole H3, and a depressed portion W2 that is bowed downward.

The depressed portion W2 comprises a front portion W21 extending from the front support portion W1 obliquely in a rearward-and-downward direction, a bottom portion W22 extending from a lower end of the front portion W21 rearward, and a rear portion W23 extending from a rear end of the bottom portion W22 obliquely in a rearward-and-upward direction and connecting to the rear support portion W1. The front portion W21 overlaps the front edge of the coccygeal region through hole H3 as viewed from above or below. The rear portion W23 overlaps the rear edge of the coccygeal region through hole H3 as viewed from above or below. By shaping the wire W into one having the depressed portion W2, the pressure exerted from the car seat S on the coccygeal bone of an occupant can be reduced.

As shown in FIG. 6 and FIG. 7, the base portion 123A is bent along left and right third bend lines L3 as references.

The left and right third bend lines L3 are lines extending parallel to the front-rear direction, and located on extension lines of the left and right second bend lines L2.

The base portion 123A has an upper surface that comprises a fourth surface SF4, and two fifth surfaces SF5. The two fifth surfaces SF5 are bent along the third bend lines L3 as references, respectively, and angled relative to the fourth surface SF4.

The fourth surface SF4 is a surface extending in an approximately horizontal position, and so arranged as to be substantially flush with the second surface SF2 of the center plate 122 (see FIG. 10(a)).

The left and right fifth surfaces SF5 are located on laterally outer sides of the left and right third bend lines L3. The right fifth surface SF5 is a slanted surface extending from the right third bend line L3 obliquely in a rightward-and-upward direction. The left fifth surface SF5 is configured to be approximately symmetric to the right fifth surface SF5.

As shown in FIG. 10(b), the raised wall portion 123B comprises, in its lower section, a recessed portion B1 that is recessed in an obliquely-rearward-and-downward direction. The recessed portion B1 extends from a right end to a left end of the raised wall portion 123B.

The ribs 123C protrude from the bottom of the recessed portion B1 upward. Upper surfaces of the ribs 123 have curved surfaces smoothly connecting the front surface of the raised wall portion 123B and the upper surface of the base portion 123A.

As shown in FIG. 6, the right second support member 130 comprises a first portion 131 located on top of the side frame 11, a second portion 132 extending from the first portion 131 laterally inward and downward, and three joint portions 134A, 134B, 134C formed at a laterally inner end of the second portion 132. The first portion 131 and the second portion 132 have their rear end portions each formed integrally with the cover member 140 in one piece, which cover member 140 covers the laterally inner side of the rear end portion of the side frame 11.

As shown in FIG. 8(a), the second portion 132 is bent along a fourth bend line L4, a fifth bend line L5, and a sixth bend line L6 as references. The fourth bend line L4 extends from a rear portion of an upper end of the second portion 132 obliquely in a frontward-and-downward direction up to a front end of the second portion 132. The fifth bend line L5 is located on a laterally inner side, and in a position lower than that, of the fourth bend line L4, and extends substantially parallel to the front-rear direction. The sixth bend line L6 is located on a laterally inner side, and in a position lower than that, of the fifth bend line L5, and extends substantially parallel to the front-rear direction.

The second portion 132 has an inner surface that comprises a sixth surface SF6, a seventh surface SF7, an eighth surface SF8, and a ninth surface SF9. The seventh surface SF7 is bordered by the fourth bend line L4 on, and slanted relative to, the sixth surface SF6. The eighth surface SF8 is bordered by the fifth bend line L5 on, and slanted relative to, the seventh surface SF7. The ninth surface SF9 is bordered by the sixth bend line L6 on, and slanted relative to, the eighth surface SF8.

The sixth surface SF6 is a slanted surface extending from a laterally inner end of the first portion 131 obliquely in a laterally-inward-and-downward direction, and forms a first angle θ1 with the horizontal plane (see FIG. 8(c)).

The seventh surface SF7 is a slanted surface extending from a lower end of the sixth surface SF6 obliquely in a laterally-inward-and-downward direction, and forms a second angle θ2 greater than the first angle θ1 with the horizontal plane (see FIG. 8(c)).

The eighth surface SF8 is a slanted surface extending from a lower end of the seventh surface SF7 obliquely in a laterally-inward-and-downward direction, and forms a third angle θ3 less than the first angle θ1 with the horizontal plane (see FIG. 8(c)). To sum up, the order of angular degrees is: θ3<θ1<θ2. The eighth surface SF8 is so arranged as to be substantially flush with the third surface SF3 and the fifth surface SF5 described above.

The ninth surface SF9 extends from a lower end of the eighth surface SF8 downward. The ninth surface SF9 is formed with three joint portions 134A, 134B, 134C and two protrusions P1, P2. In the following description, the three joint portions 134A, 134B, 134C are also referred to as first joint portion 134A, second joint portion 134B and third joint portion 134C, respectively; and the two protrusions P1, P2 are also referred to as first protrusion P1 and second protrusion P2, respectively.

The three joint portions 134A, 134B, 134C are portions joined to the wire W, and protrude from a lower portion of the ninth surface SF9 toward the first support member 120. The first joint portion 134A is located at a front end of the ninth surface SF9, the third joint portion 134C is located at a rear end of the ninth surface SF9, and the second joint portion 134B is located between the first joint portion 134A and the third joint portion 134C. The distance from the first joint portion 134A to the second joint portion 134B is shorter than the distance from the second joint portion 134B to the third joint portion 134C.

The two protrusions P1, P2 protrude from the ninth surface SF9 toward the first support member 120, and are formed along the overall length from the upper end to the lower end of the ninth surface SF9. The first protrusion P1 is located between the first joint portion 134A and the second joint portion 134B.

The first protrusion P1 has a dimension in the front-rear direction greater than that of the second protrusion P2. To be more specific, the dimension in the front-rear direction of the first protrusion P1 is approximately equal to the distance between the first joint portion 134A and the second joint portion 134B.

The second protrusion P2 is located between the second joint portion 134B and the third joint portion 134C. The distance from the second protrusion P2 to the second joint portion 134B is longer than the distance from the second protrusion P2 to the third joint portion 134C.

It is to be understood that the left second support member 130 may be configured to have a shape which is somewhat different from that of the right second support member 130, or may be configured to be symmetric to the right second support member 130.

Figure 9:
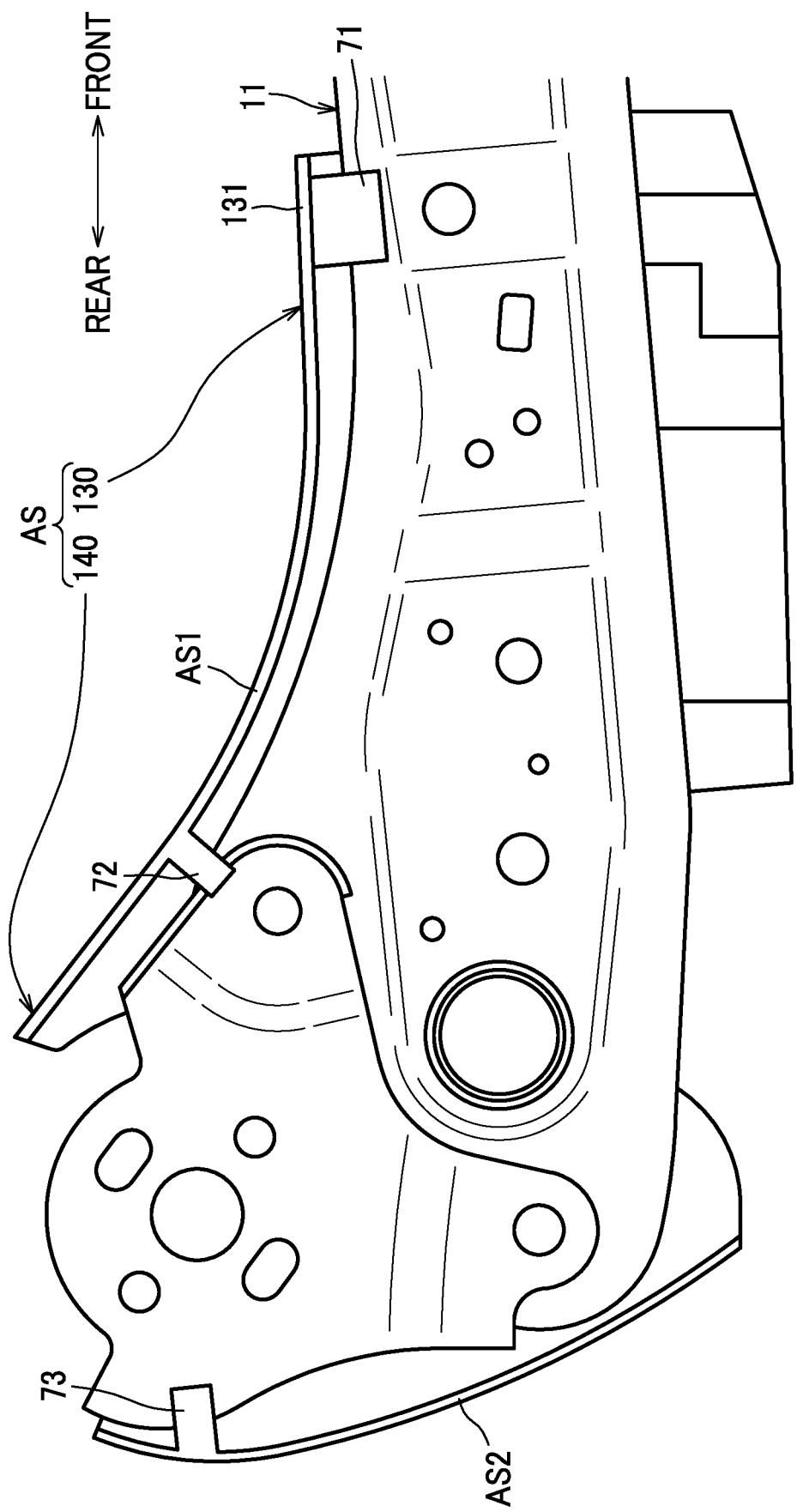
FIG. 9 is a side view showing three anchor portions.

As shown in FIG. 9, the second support member 130 and the cover member 140 are formed integrally with each other into a part AS, which comprises an upper wall AS1 located over the side frame 11, a rear wall AS2 located at a rear of the side frame 11, a first anchor portion 71, a second anchor portion 72, and a third anchor portion 73. The upper wall AS1 is a portion including the aforementioned first portion 131, and has a rear portion slanted obliquely in a rearward-and-upward direction. The rear wall AS2 extends in an upward-downward direction, and has a curved shape bulging rearward.

The first anchor portion 71 is located on the upper wall AS1, specifically at the front end portion of the first portion 131. The first anchor portion 71 extends from the laterally outer end of the first portion 131 downward. The end portion of the first anchor portion 71 is engaged with the side surface of the side frame 11.

The second anchor portion 72 is located on the upper wall AS1 in a position rearward of the laterally central position of the upper wall AS1. The second anchor portion 72 extends from a laterally outer end of a slanted portion of the upper wall AS1 obliquely in a rearward-and-downward direction, with its end portion being engaged with the side surface of the side frame 11.

The third anchor portion 73 is located on an upper portion of the rear wall AS2. The third anchor portion 73 extends from a laterally outer end of the rear wall AS2 frontward, with its end being engaged with the side surface of the side frame 11.

The third anchor portion 73 is located approximately in the same position in height as that of the second anchor portion 72. The second anchor portion 72 and the third anchor portion 73 are located in positions higher than a position of the first anchor portion 71. The third anchor portion 73 is located rearward of the second anchor portion 72, and the second anchor portion 72 is located rearward of the first anchor portion 71.

As shown in FIG. 7, the first anchor portion 71 and the first joint portion 134A are so located as to have their expanses in the front-rear direction overlapping one another. To be more specific, the front portion of the first anchor portion 71 is located within the front and rear limits defined by the expanse of the first joint portion 134A. With this configuration, the structural rigidity in attachment of the first anchor portion 71 to the side frame 11, as well as the structural rigidity in attachment of the first joint portion 134A to the wire W can be increased.

Moreover, the first anchor portion 71 and the ischial region through holes H2 are so located as to have their expanses in the front-rear direction overlapping each other. To be more specific, the first anchor portion 71 is in its entirety located within front and rear limits defined by the expanses of the ischial region through holes H2. With this configuration, the structural rigidity in attachment of the first anchor portion 71 to the side frame 11 can be increased.

In the second embodiment described above, the first anchor portion 71 is partially located within the front and rear limits defined by the expanse of the first joint portion 134, but the present invention is not limited to this arrangement; it is rather to be understood that the anchor portion may be located at least partially within the front and rear limits defined by the expanse of the joint portion, and thus, for example, the anchor portion may be located in its entirety within the front and rear limits defined by the expanse of the joint portion.

Similarly, in the second embodiment described above, the first anchor portion 71 is located in its entirety within the front and rear limits defined by the expanses of the ischial region through holes H2, but the present invention is not limited to this arrangement; it is rather to be understood that the anchor portion may be located at least partially within the front and rear limits defined by the expanses of the ischial region through holes.

In each of the embodiments described above, the number of wires W provided is three as an example, but the present invention is not limited to this example; for example the number may be two, or four or more. It is to be understood that in cases where two wires are provided, each one of the two wires may be located at a left and at a right end of the first support member.

In cases, as shown in FIG. 11, where the number of the wires W is four, two of the four wires W may be located each one at a left end and at a right end of the first support member 120, while the remaining two wires W may be located across the two ischial region through holes H2, respectively, in the front-rear direction. In such cases, portions of the two central wires W corresponding to the ischial region through holes H2 may preferably be configured each to have a shape of the depressed portion W2 as shown in FIG. 8 (b). With this configuration, the pressure applied from the car seat S on the ischial bones of an occupant can be reduced.

As shown in FIG. 12, the front ends of the wires W may be engaged with the pan frame 12A.

As shown in FIG. 13, the car seat S may further comprise third support members 51, 52 that are more flexible than the first support member 120. The third support members 51, 52 may be made, for example, of cloth or like members, or rubber, etc.

One third support member 51 is provided over each of the left and right ischial region through holes H2. The third support members 51 are provided on the center plate 122 of the first support member 120 in such a manner as to entirely close the ischial region through holes H2.

The third support member 52 is provided over the coccygeal region through hole H3. The third support member 52 is provided on the rear plate 123 of the first support member 120 in such a manner as to entirely close the coccygeal region through hole H3.

With this configuration, the ischial bones and the coccygeal bone of an occupant can be supported moderately by the third support members 51, 52 that are more flexible than the plastic first support member 120, and the pressure applied on the ischial/coccygeal bones and their vicinities of the occupant can be relieved through the third support members 51, 52.

It is to be understood that the third support member may be provided on the first support member in such a manner as to close at least partially the ischial region through holes. Similarly, it is to be understood that the third support member may be provided on the first support member in such a manner as to close at least partially the coccygeal region through hole. Moreover, the third support member may be provided in the process of forming a first support member, in which ischial region through holes and a coccygeal region through hole are provided with thin meshes formed together with the first support member.

In the above-described embodiments, the first support member 20 and the second support members 30 are joined via the wires W, but the present invention is not limited to this configuration; rather, the first support member and the second support members may be joined directly by bolts or the like.

In the above-described embodiments, the second support member 30 is formed in the shape of a plate, but the present invention is not limited to this configuration; rather, the second support member may be provided in a shape of a rod, for example, a wire.

In the above-described embodiments, the first support member 20 has a coccygeal region through hole H3 formed therein, but the present invention is not limited to this configuration; that is, the first support member may have no coccygeal region formed therein.

In the above-described embodiments, the second support members 30 are located partially within front and rear limits defined by expanses of the ischial region through holes H2, but the present invention is not limited to this configuration; the second support member may be located in its entirety within the front and rear limits defined by the expanse of the ischial region through holes.

The shape of the engagement portion may not be like a hook, but may assume other shapes, such as a groove having a U-shaped cross section, a claw having a crooked end, etc.

In the above-described embodiments, the peripheral portions around the ischial region through holes H2 are provided with slanted surfaces, but such slanted surfaces may not be provided. Slits SL may not be provided at the peripheral edge of the ischial region through holes H2. Also, similar to the ischial region through holes H2, a slit may be provided at the peripheral edge of the coccygeal region through hole H3, and/or a slanted surface may be provided around the coccygeal region through hole H3.

In the above-described embodiments, the front-rear expanses of slits extending in the lateral direction overlap the front-rear expanses of the joint portions 34A, 34B, but an alternative configuration may be feasible in which a slit SL (or at least one of a plurality of slits) extending in the lateral direction has an expanse in the front-rear direction overlapping that of the second engagement portion 22B.

In the above-described embodiments, the front-rear expanses of slits extending in the front-rear direction overlap the front-rear expanse of the second engagement portion 22B, but an alternative configuration may be feasible in which a slit SL (or at least one of a plurality of slits) extending in the front-rear direction has an expanse in the front-rear direction overlapping those of the joint portions 34A, 34B.

In the above-described embodiments, through holes such as ischial region through holes and a coccygeal region through hole are provided by way of example, but these elements may be provided as recesses, or an elastic member that is more flexible than the material of the plastic plate may be provided in positions corresponding to the through holes.

In the above-described embodiments, a car seat S for use in an automobile is taken as an example of a vehicle seat, but the present invention is not limited thereto and may be adopted in other vehicle seats, such as seats for use in ships, aircrafts, etc.

Any of the elements explained in relation to the above-described embodiments and modified examples may be implemented in combination as desired.

The invention claimed is:

1. A vehicle seat, comprising:
left and right side frames disposed left and right separately from each other;
a first support member disposed between the left and right side frames to support an occupant; and
left and right second support members joined to left and right sides of the first support member and having left and right outer sides supported by the side frames to support the occupant in conjunction with the first support member,
wherein the first support member is a plate-shaped member, and has left and right ischial region holes formed in positions corresponding to ischial bones of the occupant,
wherein the second support members are located at least partially within front and rear limits defined by an expanse of the ischial region holes,
wherein the second support members comprise a first joint portion joined to the first support member, and
wherein the first joint portion is located within the front and rear limits defined by the expanse of the ischial region holes.

2. The vehicle seat according to claim 1,
wherein the second support members comprise a second joint portion joined to the first support member,
wherein the second joint portion is located rearward relative to the ischial region holes.

3. The vehicle seat according to claim 1, wherein a slit is formed at a peripheral edge of the ischial region holes.

4. The vehicle seat according to claim 3, wherein the slit extends in a lateral direction, and is located within front and rear limits defined by an expanse of the first joint portion.

5. The vehicle seat according to claim 3, further comprising a pair of connecting members disposed in front and behind separately from each other, each connecting member connecting the left and right side frames,
wherein the first support member comprises a plurality of wires running between the pair of connecting members, and a plastic plate by which the plurality of wires are joined together, the plastic plate comprising a second engagement portion engageable with the wire, and
wherein the slit extends in a front-rear direction and is located at least partially within front and rear limits defined by an expanse of the second engagement portion.

6. The vehicle seat according to claim 1,
wherein the first support member has a coccygeal region hole formed in a position corresponding to a coccygeal bone of the occupant,
wherein part of the second support members is located within front and rear limits defined by an expanse of the coccygeal region hole.

7. The vehicle seat according to claim 6, further comprising a third support member that is more flexible than the first support member,
wherein the third support member is provided on the first support member in such a manner as to close at least partially the coccygeal region hole.

8. The vehicle seat according to claim 6, wherein the coccygeal region hole comprises a through hole.

9. The vehicle seat according to claim 1, further comprising a cover member with which a laterally inner side of a rear end portion of the side frames is covered,
wherein the second support member is formed integrally with the cover member in one piece.

10. The vehicle seat according to claim 1, further comprising a third support member that is more flexible than the first support member,
wherein the third support member is provided on the first support member in such a manner as to close at least partially the ischial region holes.

11. The vehicle seat according to claim 1, wherein the ischial region holes comprise through holes.

12. A vehicle seat, further comprising:
left and right side frames disposed left and right separately from each other;
a first support member disposed between the left and right side frames to support an occupant;
left and right second support members joined to left and right sides of the first support member and having left and right outer sides supported by the side frames to support the occupant in conjunction with the first support member; and
a pair of connecting members disposed in front and behind separately from each other, each connecting member connecting the left and right side frames,
wherein the first support member comprises a plurality of wires running between the pair of connecting members, and a plastic plate by which the plurality of wires are joined together,
wherein the first support member is a plate-shaped member, and has left and right ischial region holes formed in positions corresponding to ischial bones of the occupant, and
wherein the second support members are located at least partially within front and rear limits defined by an expanse of the ischial region holes.

13. The vehicle seat according to claim 12, wherein the second support members comprise a first engagement portion engageable with the wire.

14. A vehicle seat, comprising, left and right side frames disposed left and right separately from each other;
a first support member disposed between the left and right side frames to support an occupant; and
left and right second support members joined to left and right sides of the first support member and having left and right outer sides supported by the side frames to support the occupant in conjunction with the first support member,
wherein the first support member is a plate-shaped member, and has an ischial region pressure relieving part formed in a position corresponding to ischial bones of the occupant,
wherein the second support members are located at least partially within front and rear limits defined by an expanse of the ischial region holes,
wherein the second support members comprise a first joint portion joined to the first support member, and
wherein the first joint portion is located within the front and rear limits defined by the expanse of the ischial region pressure relieving part.

15. The vehicle seat according to claim 14,
wherein the second support members comprise a second joint portion joined to the first support member,
wherein the second joint portion is located rearward relative to the ischial region pressure relieving part.

16. The vehicle seat according to claim 14, wherein a slit is formed at a peripheral edge of the ischial region pressure relieving part.

17. The vehicle seat according to claim 14,
wherein the first support member has a coccygeal region pressure relieving part formed in a position corresponding to a coccygeal bone of the occupant,
wherein part of the second support members is located within front and rear limits defined by an expanse of the coccygeal region pressure relieving part.

* * * * *